US008720562B2

(12) United States Patent
Reddy et al.

(10) Patent No.: US 8,720,562 B2
(45) Date of Patent: May 13, 2014

(54) WELLBORE CEMENTING COMPOSITIONS AND METHODS OF MAKING AND USING SAME

(75) Inventors: B. Raghava Reddy, The Woodlands, TX (US); Rahul Chandrakant Patil, Pune (IN); Sandip Pati, Pune (IN)

(73) Assignee: Halliburton Energy Services, Inc., Duncan, OK (US)

( * ) Notice: Subject to any disclaimer, the term of this patent is extended or adjusted under 35 U.S.C. 154(b) by 608 days.

(21) Appl. No.: 12/907,209

(22) Filed: Oct. 19, 2010

(65) Prior Publication Data

US 2012/0090841 A1 Apr. 19, 2012

(51) Int. Cl.
*E21B 33/13* (2006.01)
(52) U.S. Cl.
USPC .......................................... 166/292
(58) Field of Classification Search
None
See application file for complete search history.

(56) References Cited

U.S. PATENT DOCUMENTS

| | | | |
|---|---|---|---|
| 3,511,313 A * | 5/1970 | Eilers et al. | 166/295 |
| 4,474,951 A | 10/1984 | Pope | |
| 4,784,693 A | 11/1988 | Kirkland et al. | |
| 5,346,012 A | 9/1994 | Heathman et al. | |
| 5,484,903 A | 1/1996 | Szablikowski et al. | |
| 5,588,488 A | 12/1996 | Vijn et al. | |
| 5,913,364 A | 6/1999 | Sweatman | |
| 6,167,967 B1 | 1/2001 | Sweatman | |
| 6,258,757 B1 | 7/2001 | Sweatman et al. | |
| 6,405,801 B1 | 6/2002 | Vijn et al. | |
| 6,457,524 B1 | 10/2002 | Roddy | |
| 6,626,992 B2 | 9/2003 | Vijn et al. | |
| 6,730,636 B2 | 5/2004 | Vijn et al. | |
| 6,989,354 B2 | 1/2006 | Thaemlitz et al. | |
| 7,077,203 B1 | 7/2006 | Roddy et al. | |
| 7,174,962 B1 | 2/2007 | Roddy et al. | |
| 7,642,223 B2 | 1/2010 | Santra et al. | |
| 7,694,739 B2 | 4/2010 | Brothers et al. | |
| 2003/0121661 A1 * | 7/2003 | Reddy et al. | 166/293 |

FOREIGN PATENT DOCUMENTS

| | | |
|---|---|---|
| DE | 19515477 A1 | 10/1996 |
| EP | 1614669 A1 | 1/2006 |
| WO | 2012052712 A2 | 4/2012 |

OTHER PUBLICATIONS

Foreign communication from a related counterpart application—International Search Report and Written Opinion, PCT/GB2011/001498, Oct. 17, 2012, 15 pages.
ANSI/API Recommended Practice 10B-2 (formerly 10B)/ISO 10426-2, Petroleum and Natural Gas, "Recommended practice for testing well cements," Jul. 2005, pp. 90-95 plus 1 cover page, American Petroleum Institute.
Clements, John H., "Reactive applications of cyclic alkylene carbonates," Ind. Eng. Chem. Res., 2003, pp. 663-674, vol. 42, No. 4, American Chemical Society.
Halliburton brochure entitled, "Diacel LWL—cement retarder/fluid-loss additive," 1999, 2 pages, Halliburton Energy Services, Inc.
Halliburton brochure entitled, "FWCA™—free water cement additive," Cementing, 2007, 2 pages, Halliburton.
Halliburton brochure entitled, "Halad®—9—fluid-loss additive," 1999, 2 pages, Halliburton Energy Services, Inc.
Halliburton brochure entitled, "Halad®—344—fluid loss additive," Cementing, 2007, 2 pages, Halliburton.
Halliburton brochure entitled, "OptiCem RT™ cement job design and simulation system—now, see what's happening while you can still do something about it," Cementing, 2005, 2 pages, Halliburton.
Halliburton brochure entitled, "SA—541—suspending aid," 1999, 2 pages, Halliburton Energy Services, Inc.
Halliburton brochure entitled, "Suspend HT additive—suspending agent," 1999, 2 pages, Halliburton Energy Services, Inc.
Huntsman brochure entitled, "JEFFSOL® alkylene carbonates," 2001, pp. 1-28 plus 8 additional pages, Huntsman Corporation.
Foreign communication from a related counterpart application—International Preliminary Report on Patentability, PCT/GB2011/001498, Apr. 23, 2013, 11 pages.

* cited by examiner

*Primary Examiner* — Angela M DiTrani
(74) *Attorney, Agent, or Firm* — Craig Roddy; Conley Rose, P.C.

(57) ABSTRACT

A method of cementing a wellbore comprising preparing a wellbore cementing composition comprising a cementitious materials and a modified biopolymer additive wherein the modified biopolymer additive is the reaction product of a process comprising contacting a biopolymer and an organic carbonate to form a reaction mixture and subjecting the reaction mixture to a temperature of from about 100° F. to about 250° F. and placing the wellbore cementing fluid in the wellbore. A method of cementing a wellbore comprising contacting a modified biopolymer additive with a cementitious slurry to produce a wellbore cementing composition having an initial viscosity, $v_0$; placing the wellbore cementing composition to a desired depth in a subterranean formation wherein the wellbore cementing composition has a transitional viscosity, $v_t$, during placement in the subterranean formation and a final viscosity, $v_f$, at the desired depth wherein $v_f \geq v_t > v_0$; and allowing the wellbore cementing composition to set.

20 Claims, 3 Drawing Sheets

WELLBORE CEMENTING COMPOSITIONS AND METHODS OF MAKING AND USING SAME

FIELD

This disclosure relates to wellbore cementing compositions. More specifically, it relates to wellbore cementing compositions comprising modified biopolymers and methods of using same.

BACKGROUND

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

During the cementing process, a drawback to the use of cement slurries containing high-density additives (e.g., weighting agents) is their high viscosity due to the high solids content, as well as the presence of viscosifying agents (e.g., viscosifying polymers) which function to prevent settling of high density materials. These factors among others often necessitate the use of high pump pressures and/or low pump rates to place the slurries in the wellbore. This issue is often mitigated only slightly by the inclusion of high levels of additives such as dispersants. Addition of dispersants to reduce surface viscosities may also result in settling of solids when the slurries are exposed to the maximum bottom hole temperature due to thermal thinning of the viscosifying polymers. Additionally, the higher viscosity of the cement slurry is often advantageously exploited only after it passes through the deeper end of the casing ("turns the corner") and contacts the formation where it may function to mitigate fluid loss and settling. Consequently, there is continuing need and interest to develop wellbore cementing compositions (e.g., cement slurries) having desirable rheological and operational properties.

SUMMARY

Disclosed herein is a method of cementing a wellbore comprising preparing a wellbore cementing composition comprising a cementitious materials and a modified biopolymer additive wherein the modified biopolymer additive is the reaction product of a process comprising contacting a biopolymer and an organic carbonate to form a reaction mixture and subjecting the reaction mixture to a temperature of from about 100° F. to about 250° F. and placing the wellbore cementing fluid in the wellbore.

Also disclosed herein is a method of cementing a wellbore comprising contacting a modified biopolymer additive with a cementitious slurry to produce a wellbore cementing composition having an initial viscosity, $v_0$; placing the wellbore cementing composition to a desired depth in a subterranean formation wherein the wellbore cementing composition has a transitional viscosity, $v_t$, during placement in the subterranean formation and a final viscosity, $v_f$, at the desired depth wherein $v_f \geq v_t > v_0$; and allowing the wellbore cementing composition to set.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the embodiments disclosed herein, reference will now be made to the accompanying drawings in which.

DETAILED DESCRIPTION

Figure 1:
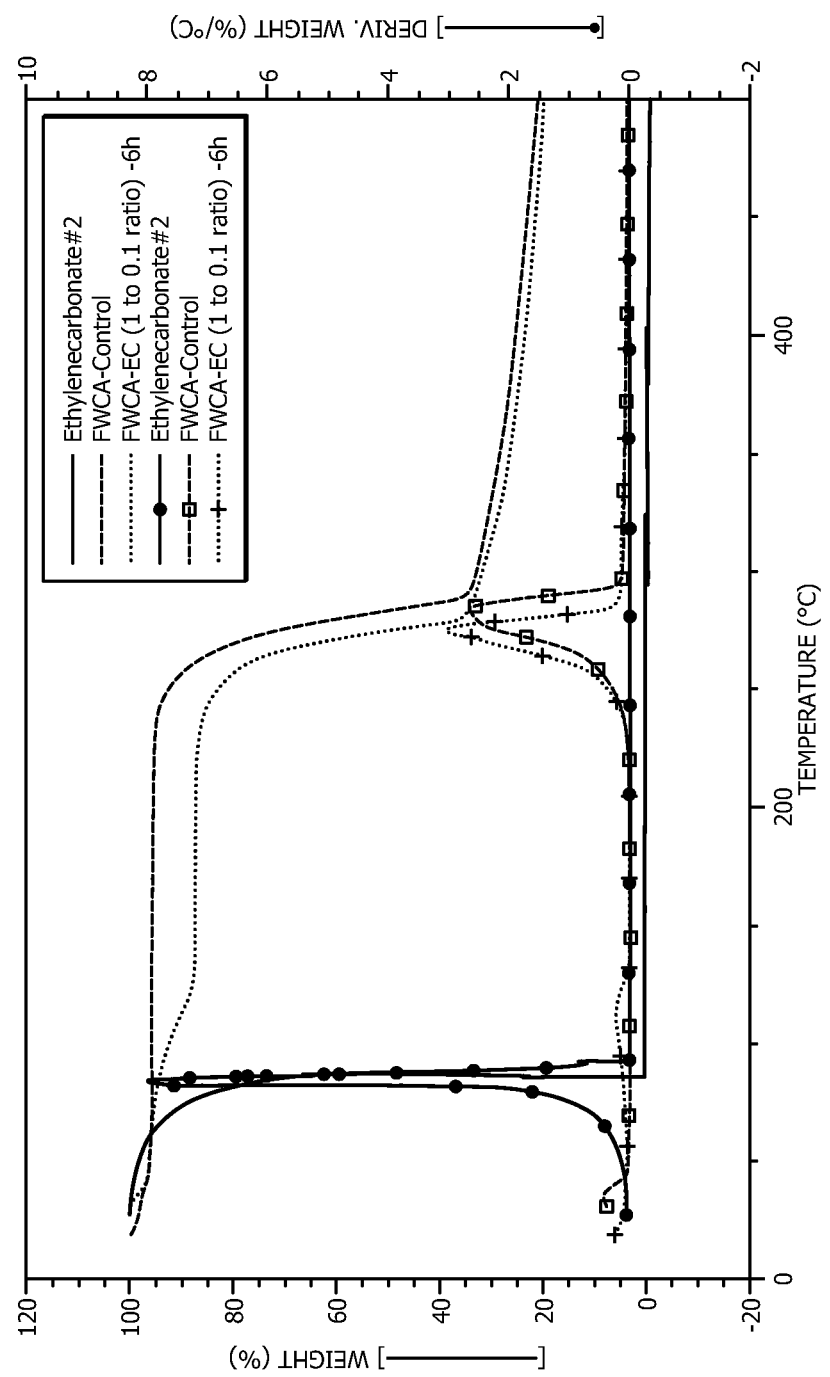
FIG. 1 shows a thermal gravimetric analysis (TGA) chart comparing the effects of the unmodified biopolymer, the organic carbonate, and the modified biopolymer on a cement slurry.

Disclosed herein are wellbore cementing compositions and methods of making and using same. In an embodiment, the wellbore cementing composition comprises a cementitious material and a modified biopolymer additive (MBA). In an embodiment, the wellbore cementing composition is a pumpable cementitious slurry comprising a cementitious material, an MBA, and a liquid (e.g., water). In an embodiment, the MBA is a reaction product of a polymer and an organic carbonate each of which will be described in more detail later herein. In additional embodiments, the MBA is an organic carbonate modified polymer, an organic carbonate modified biopolymer, an organic carbonate modified polysaccharide, or combinations thereof. Wellbore cementing compositions of the type described herein may display desirable characteristics such as reduced particle settling, reduced fluid loss, and improved rheology.

In an embodiment, a reaction mixture for the preparation of an MBA comprises a polymer, alternatively a biopolymer, alternatively a polysaccharide. In an embodiment, the polymer is a biopolymer which comprises a polysaccharide that may be represented by the formula $C_x(H_2O)_y$ where x and y are greater than 0. Herein, a biopolymer refers to a polymer that is generated from renewable natural sources and is often biodegradable. Biopolymers suitable for use in this disclosure may be produced by biological systems (i.e. micro-organisms, plants and animals), or obtained by chemical derivatization of such biological starting materials (e.g. hydroxyethylated, hydroxypropylated, carboxymethylated and/or carboxymethylated hydroxyethylated derivatives of such biopolymers). Nonlimiting examples of biopolymers suitable for use in this disclosure include gums; starches, celluloses, derivatized polysaccharides such as hydroxyethyl cellulose (HEC), carboxymethyl cellulose, and carboxymethylhydroxyethyl cellulose.

In an embodiment, the biopolymer comprises a gum. Herein, a gum refers to polysaccharides that are exuded by certain plants and trees, stored by plants as seed endosperm, produced by bacteria as exocellular materials, and/or dried into water-soluble, noncrystalline, brittle solids. Gums may be further characterized by their ability to increase the viscosity of a solution. In general, viscosity may be considered a measure of the resistance of a fluid which is being deformed by shear stress. In other words, it is the resistance of a liquid to flow. Gums having the characteristics disclosed herein that are obtained from man-made sources (e.g., synthetic) are also contemplated as being suitable for use in this disclosure. Non-limiting examples of gums suitable for use in this disclosure include without limitation agar, alginic acid, beta-glucan, carrageenan, chicle gum, dammar gum, gellan gum, guar gum, gum arabic, gum ghatti, gum tragachanth, karava gum, locust bean gum, mastic gum, psyllium seed husks, sodium alginate, spruce gum, tara gum, xanthan gum, or combinations thereof. Non-limiting examples of gum derivatives suitable for use in this disclosure include hydroxypropyl guar, and caboxymethyl hydroxypropyl guar. Non-limiting examples of bacterial gums suitable for use in this disclosure include diutan and xanthan.

In an embodiment, the biopolymer comprises cellulose and/or its chemically derivatized water soluble derivatives. Cellulose herein refers to a polysaccharide consisting of a linear chain of β(1→4) linked D-glucose units. Non-limiting examples of water-soluble cellulose derivatives include hydroxyethyl cellulose, hydroxypropyl cellulose, carboxymethyl cellulose, and carboxymethylhydroxyethyl cellulose. Non-limiting examples of commercially available biopolymers suitable for use in this disclosure include CELLOSIZE brand products from Dow Chemical Company, NATRASOL brand products from Hercules Corporation and TYLOSE brand products from Clariant Corporation, Mount Holly, N.C.

In an embodiment, a biopolymer suitable for use in this disclosure has a molecular weight (MW) of from about 100,000 Daltons to about 10,000,000 Daltons, alternatively from about 300,000 Daltons to about 5,000,000 Daltons, alternatively from about 500,000 Daltons to about 1,500,000 Daltons.

In an embodiment, a biopolymer suitable for use in this disclosure is in the solid form (e.g., as granules) and may have a mesh size of from about 80 to about 200, alternatively from about 10 to about 190, alternatively from about 50 to about 150.

In an embodiment, the biopolymer is present in a reaction mixture for preparation of an MBA in an amount of from about 75 wt. % to about 95 wt. % based on total weight of the reaction mixture, alternatively from about 80 wt. % to about 95 wt. %, alternatively from about 85 wt. % to about 95 wt. %.

In an embodiment, a reaction mixture for preparation of the MBA comprises an organic carbonate. Generally, the organic carbonate comprises at least one carbonate group represented by the formula $(O=C(O-C)_2)$. In an embodiment, the organic carbonate has multiple carbonate groups. In some embodiments, a reaction mixture for the preparation of an MBA comprises more than one type of organic carbonate.

In another embodiment, the organic carbonate is characterized by the general formula ROCOOR', or $RR'CO_3$ where R and R' can be the same or different. In some embodiments, R and R' are the same. In an embodiment, R and/or R' may be an organyl group; alternatively, a hydrocarbyl group. Herein, the term "organyl group" refers to an organic substituent group, regardless of functional type, having one free valence at a carbon atom. Herein, the term "hydrocarbyl group" refers to a univalent group formed by removing a hydrogen atom from a hydrocarbon. In embodiments, R and/or R' may be a $C_1$ to $C_{20}$ organyl group; alternatively, a $C_1$ to $C_{10}$ organyl group; alternatively, a $C_1$ to $C_5$ organyl group. In other embodiments, R and/or R' may be a $C_1$ to $C_{20}$ hydrocarbyl group; alternatively, a $C_1$ to $C_{10}$ hydrocarbyl group; alternatively, a $C_1$ to $C_5$ hydrocarbyl group. In some embodiments, R and/or R' may be selected from the group consisting of an alkylidene group, an alkyl group, a cycloalkyl group, a substituted cycloalkyl group, an aryl group, a substituted aryl group, a heteroaryl group and a substituted heteroaryl group. In an embodiment, the organic carbonate group may be part of a cyclic structure, or stated differently, a cyclic carbonate, for example ethylene carbonate, propylene carbonate, and glyceryl carbonate. A non-limiting example of an acyclic carbonate is diethyl carbonate. Many such suitable organic carbonates are available from Huntsman Corporation, The Woodlands, Tex. under the trade name of JEFFSOL. In an embodiment, the organic carbonate utilized to produce the MBA comprises ethylene carbonate, trimethylene carbonate, dimethyl trimethylene carbonate, 3-ethyl-3-hydroxymethyl trimethylene carbonate, propylene carbonate, glyceryl carbonate, trimethylolpropane monocarbonate, glycerine carbonate, butylene carbonate, 4,6 dimethyl-1,3-propylene carbonate, 2,2-dimethyl trimethylene carbonate, 1,3-dioxepan-2-one, diethyl carbonate, derivatives thereof, and/or combinations thereof. The organic carbonate may be a solid or a liquid. In an embodiment, the organic carbonate is a solid and has a melting point of less than about the reaction temperature employed during formation of the modified biopolymer as will be described in greater detail later herein.

The carbonate functionality of the organic carbonate may be chemically reactive in the presence of suitable functional groups, such as for example, alcohols, thiols, carboxylic acids, carboxylic acid anhydrides, and/or amine groups. The type of products formed between compounds containing the above listed functional groups and an organic carbonate may depend on the reaction conditions. For example, in the presence of a base such as sodium hydroxide or a quaternary ammonium halide under aqueous conditions, the reaction between a compound containing an alcohol (i.e. having hydroxyl groups) and an organic carbonate, for example ethylene carbonate, is a hydroxyethylation reaction, and not a transesterification reaction. The resulting hydroxyethylated products may show enhanced water solubilities. For example, insoluble cellulose may be hydroxyalkylated in this manner to form water soluble hydroxyethyl cellulose. On the other hand, using acidic (Lewis or Bronsted type) or weakly basic catalysts, the reaction between the compound containing alcohol groups and an organic carbonate is a transesterification reaction, wherein either one or both of the ester functionalities of the organic carbonate can undergo transesterification reactions. Such reactions typically employ solvents. These reactions are described in greater detail in Ind. Eng. Chem. Res, 2003, 42, 663-674 and in a technical bulletin entitled "JEFFSOL Alkylene Carbonates"; Huntsman Petrochemical Corporation: Austin, Tex., 2001, both of which are incorporated by reference herein in their entirety.

In an embodiment, the organic carbonate is present in the reaction mixture for preparation of an MBA in an amount of from about 5 wt. % to about 25 wt. % based on total weight of the reaction mixture, alternatively from about 10 wt. % to about 25 wt. %, alternatively from about 15 wt. % to about 25 wt. %.

In an embodiment, a method of preparing an MBA of the type described herein comprises contacting a biopolymer of the type described herein (e.g., HEC) and an organic carbonate (e.g., ethylene carbonate) to form a reaction mixture. The reaction mixture may contain a weight ratio of biopolymer to organic carbonate in the range of from about 1:0.01 to about 1:0.5; alternatively from about 1:0.08 to about 1:0.20; alternatively from about 1:0.1 to about 1:0.15 to form a reaction mixture. In some embodiments, the biopolymer prior to contact with an organic carbonate may contain an undesirable level of moisture (e.g., water). In such embodiments, the biopolymer prior to reaction with the organic carbonate may be subjected to a dehydration process (e.g., thermal drying) to reduce the moisture content of the material to less than about 10 weight percent (wt. %) water, alternatively less than about 5 wt. %, alternatively less than about 1 wt. %.

In an embodiment, the reaction mixture excludes basic catalysts and/or quaternary ammonium compounds. Without wishing to be limited by theory it is thought that the exclusion of such compounds will prevent the organic carbonates and biopolymers from undergoing a hydroxyalkylation reaction resulting in a MBA of increased solubility when compared to the starting biopolymer.

In an embodiment, the reaction mixture excludes chemicals, for example solvents, containing reactive hydrogen atoms, e.g., those that contain free hydroxyl, mercapto, carboxylic acid, carboxylic acid anhydride, imido, and/or amido groups. In an embodiment, the reaction mixture excludes non-aqueous solvents.

In an embodiment, the reaction mixture comprises an organic carbonate that is a solid. In such embodiments, the reaction mixture may employ a non-aqueous solvent to facilitate solvation of the organic carbonate. In an embodiment, a solid organic carbonate and nonaqueous solvent is employed. In such an embodiment, the non-aqueous solvent does not contain groups reactive to hydrogen and the solid organic carbonate may have a mesh size comparable to those previously disclosed for the biopolymer reagent. Further in such embodiments, the methodology for preparation of the MBA may further comprise removal of the non-aqueous solvent prior to the reaction phase, for example prior to heating the mixture to the desired reaction temperature.

In an embodiment, the method of preparing an MBA further comprises exposing the reaction mixture to a temperature in the range of from about 100° F. to about 250° F.; alternatively from about 120° F. to about 200° F.; alternatively from about 140° F. to about 180° F. for a period of time in the range of from about 1 hr to about 36 hrs; alternatively from about 3 hrs to about 30 hrs; or alternatively from about 5 hours to about 24 hours. Exposure of the reaction mixture to the disclosed temperature may be performed by introducing the reaction mixture into a roller oven to ensure homogeneous blending of reaction components. The resulting material (i.e., MBA) may be used in a wellbore cementing composition without further processing. Alternatively, the MBA may be further processed to meet some user and/or process desired need before being utilized in the wellbore cementing composition.

In an embodiment, at least one of the components (e.g., biopolymer) used to prepare the MBA is in the solid state and the reaction is carried out as a solid-state reaction such that the product (i.e., MBA) is a material in the solid state. In an embodiment, the MBA as formed is substantially free of liquid wherein substantially free refers to less than about 1% of the MBA is in the liquid form, alternatively less than about 0.1%, alternatively less than about 0.01%. In an embodiment, the reaction mixture contains no solvent. Alternatively, the amount of solvent present in the reaction mixture is the minimum amount of solvent necessary to dissolve at least one of the components of the reaction mixture. In such embodiments, the resultant product (i.e., MBA) is formed in a free-flowing, solid state. Without wishing to be limited by theory, the disclosed solid-state reaction methodology may avoid undesired chemical reactions that occur (or may prematurely occur) with chemicals containing active hydrogen atoms (e.g., solvents), especially under high pH conditions (that is, pH greater than 8). Reduction or absence of the undesired chemical reactions may facilitate the formation of an MBA that provides rheological and other characteristics useful in well treatments as will be described in more detail later herein. In addition, avoiding the use of solvents in the production of the MBA may provide economic advantages as well as prevent the introduction of undesirable solvents into a well treatment fluid, and subsequently into a well. Furthermore, obtaining the final reaction product directly as a solid at the end of the production phase may save the cost of removing and disposing of solvents.

Without wishing to be limited by theory, MBAs of the type described herein may be the product of an intra- and/or inter-molecular complex transesterification mechanism and not the product of a hydroxyalkylation reaction. The increased product viscosities for some MBAs may suggest the MBA has a molecular weight that is greater than that of the biopolymer starting reagent. Without being limited by theory, the organic carbonates may participate in intra-molecular transesterification reactions with alcohol groups on adjacent carbons, for example the C2 and C3 carbons of hexose rings, to form intra-chain carbonate groups. Alternatively, inter-molecular transesterification reactions between the alcohol groups on two different polymer chains may lead to the formation of inter-chain carbonate groups. Alternatively, both of the preceding transesterification reactions may occur at the same or similar times. The inter-chain carbonate formation is akin to cross-linking, which may lead to increased molecular weight and increased viscosities. The intra-chain carbonate formation may decrease the solubility of MBA, due to a decreased number of free hydroxyl groups resulting in a decreased ability to hydrogen-bond with water. The ratio of intra- to inter-chain carbonate formations appears to be dependent on monomer structure, polymer chain conformation in solid state, and/or the carbonate structure. From the reduced hydratability and solubility of the MBA, it is contemplated that the methodology disclosed herein involves reactions that do not proceed via hydroxyethylation as the hydroxyethylated polysaccharides show enhanced solubility. Without wishing to be limited by theory, it is believed that other carbonate analogues, such as cyclic carbamates and imidazolidones, and organic esters, may provide similar benefits in the modification of polysaccharides as do the organic carbonates, and are therefore contemplated for use in the present disclosure.

In an embodiment, an MBA of the type described herein may be further characterized as being insoluble in water at room temperature. For example, the MBA may have a solubility in water in the range of from about 0.01% to about 2%, alternatively from about 0.05% to about 1%, alternatively from about 0.1% to about 1.0%, alternatively from about 0.1% to about 0.5% at room temperature (i.e., from about 20° C. to about 25° C.). In an embodiment, the biopolymer used for preparation of the MBA has a solubility in water at room temperature that is greater than the solubility of the MBA.

In an embodiment, an MBA of the type described herein is present in the cement slurry composition in an amount of from about 0.05% to about 5% by weight of cement, alternatively from about 0.1% to about 3% by weight of cement, alternatively from about 0.1% to about 2.5% by weight of cement, alternatively from about 0.15% to about 2.5% by weight of cement.

In an embodiment, the wellbore cementing composition comprises a cementitious material. Any cement suitable for use in subterranean well cementing operations may be included in the wellbore cementing compositions of this disclosure. In an embodiment, the cementitious materials comprise a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Other examples of cements suitable for use in this disclosure are described in U.S. Pat. Nos. 6,457,524; 7,077,203; and 7,174,962, each of which is incorporated herein by reference in its entirety. In an embodiment, the cementitious material is present in the wellbore cementing composition in an amount of from about 50% to about 100% by total weight of solids, alternatively from about 60% to about 95%, alternatively from about 70% to about 85%.

In an embodiment, the wellbore cementing compositions comprise water. Water suitable for use in this disclosure include without limitation fresh water, salt water (e.g., water containing one or more salts dissolved therein), brine (e.g., saturated salt water, such as that produced from subterranean formations), or seawater. Generally, the water may be from any source provided that it does not contain an excess of compounds that adversely affect other components in the wellbore cementing composition. In an embodiment, water is present in the wellbore cementing composition in an amount sufficient to meet some user and/or process desired need. For example, the wellbore cementing composition may have a water content of from about 35% to about 180% by weight of cement (bwoc), alternatively from about 40% to about 120% bwoc, alternatively from about 45% to about 110% bwoc.

In some embodiments, additives may be included in the wellbore cementing composition for improving or changing the properties thereof. Examples of such additives include but are not limited to, defoamers, foaming surfactants, weighting materials, latex emulsions, dispersants, vitrified shale and other fillers such as silica flour, sand and slag, formation conditioning agents, hollow glass or ceramic beads or combinations thereof. Other mechanical property modifying additives, for example, elastomers, carbon fibers, glass fibers, metal fibers, minerals fibers, and the like can be added to further modify the mechanical properties. These additives may be included singularly or in combination using any suitable methodology.

In an embodiment, the wellbore cementing composition comprises a cementitious material, water, an MBA and optional additives all of the type described previously herein. Such a composition is hereinafter termed an MBA-containing cement composition (MBAC). An MBAC may comprise, for example, from about 35% to about 70% cementitious material by total weight of solids, from about 25% to about 80% water bwoc, and from about 0.1% to about 5% MBA bwoc. Alternatively, the MBAC may comprise from about 40% to about 70% cementitious material by total weight of solids, from about 30% to about 70% water bwoc, and from about 0.5% to about 1.5% MBA by total weight of the solids. It is contemplated that the MBAC may be prepared as a cement slurry which can be placed into a subterranean formation and set into a hard mass. In an embodiment, a methodology for the preparation of cementitious slurry of the type described herein (i.e., a MBAC) comprises contacting the components of the MBAC in any order compatible with the needs of the process. For example, the MBAC may be prepared by dry mixing the MBA and other solid materials to be included in the composition to form a dry mixture which may then be contacted with the liquid components of the MBAC. In the alternative, the MBA may be added to the liquid components of the MBAC prior to, concurrently with or subsequent to the other components of the MBAC. The components of the MBAC may be contacted using any mixing device compatible with the composition, for example a batch mixer, or a recirculating cement mixer (RCM) having continuous feed lines for high volume cement production.

In an embodiment, the MBAC has a density of from about 6 ppg to about 23 ppg, alternatively from about 11 ppg to about 18 ppg, or alternatively from about 12 ppg to about 16 ppg.

In an embodiment, an MBAC of the type described herein exhibits a temperature dependent viscosity. Herein, viscosity refers to a measure of the resistance of a fluid which is being deformed by shear stress (i.e., the resistance of a liquid to flow) and may be measured using a FANN 35 viscometer. In an embodiment, an MBAC may, prior to being introduced to the wellbore formation, have some initial viscosity, designated $v_0$, wherein $v_0$ may be in the range of from about 5 centipose (cP) to equal to or greater than about 100 cP, alternatively from about 7 cP to about 100 cP, alternatively from about 9 cP to about 100 cP, or alternatively from about 5 cP to about 25 cP. Upon introduction to the wellbore, the temperature to which the MBAC is exposed increases as the MBAC encounters increasing formation depths resulting in an increase in the viscosity of the MBAC. This increasing viscosity as the MBAC moves to increasing depths of the formation is termed the transitional viscosity and designated $v_t$, wherein $v_t > v_0$. After the MBAC reaches some user and/or process desired depth the composition may be said to achieve its final viscosity, designated $v_f$ wherein $v_f \geq v_t$. In an embodiment $v_f$ may be greater than about 100 cp, alternatively greater than about 150 cP, alternatively greater than about 200 cP. Without wishing to be limited by the theory, as the MBAC is exposed to increasing temperatures a larger amount of the MBA becomes activated by hydrolysis and dissolution in the composition thereby increasing the viscosity of the composition (i.e., MBAC). For example, the MBA which is insoluble at the surface of the formation may have less than about 10%, alternatively less than about 9, 8, 7, 6, 5, 4, 3, 2, or 1% of the MBA dissolved in the MBAC. However, at the desired location within the subterranean formation greater than about 90% of the MBA may become activated by hydrolysis and dissolution in the MBAC, alternatively greater than about 91, 92, 93, 94, 95, 96, 97, 98, or 99% of the MBA may be dissolved in the MBAC. The fraction of MBA which becomes dissolved at any location may be roughly estimated by dividing the viscosity measured at a given time by final viscosity.

In some embodiments, the MBAC viscosity may be adjusted through the use of one or more encapsulated basic materials. Such materials may be employed so as to result in the release of the basic material into the MBAC after introduction of the composition to the subterranean formation. In an embodiment, an encapsulated basic material may designed so that the basic material is released from encapsulation and contacts the MBAC after it has reached a desired wellbore depth and/or has been placed into a desired area of the formation. It will be understood by one of ordinary skill in the art with the benefits of this disclosure that the MBAC will have achieved some transitional viscosity ($v_t$) and the introduction of the basic material to the MBAC will lead to even further viscosification of the composition such that $v_f > v_t$. Cement compositions which may benefit from the use encapsulated basic materials and an MBA may be those which in slurry exhibit a pH value of less than about 8. Nonlimiting examples of cements which in the slurry form typically display pH values of less than about 8 include aluminate cements, gypsum cements and cement compositions containing high levels of neutral pH fillers such as Class F flyashes.

In an embodiment, the basic material is a solid and is encapsulated by spray coating a variety of materials thereon, including but not limited to a wax, a drying oil such as tung oil and linseed oil, a polyurethane, a crosslinked partially hydrolyzed polyacrylic, a water-degradable compound or polymer such as EDPM rubber, polyvinyldichloride, nylon, waxes, fatty acid esters, or combinations thereof. In an embodiment, the basic material comprises an aqueous solution and is encapsulated in a particulate porous solid material that remains dry and free flowing after absorbing the aqueous solution and through which the aqueous solution slowly diffuses. Examples of such particulate porous solid materials include but are not limited to diatomaceous earth, zeolites, silica, alumina, metal salts of alumino-silicates, clays, hydrotalcite, styrenedivinylbenzene based materials, cross-linked polyalkylacrylate esters, cross-linked modified starches, and combinations thereof. To delay the reaction even longer, an external coating of a polymeric material through which an aqueous solution slowly diffuses can be placed on the porous solid material. In an embodiment, the basic material is encapsulated in a water soluble coating such that the coating comes in contact with water upon preparation (e.g., mixing) of a slurry, begins to degrade during the preparation and pumping phases of a cementing treatment. Encapsulation methods and their use in wellbore cementing operations are described in greater detail for example in U.S. Pat. Nos. 6,989,354 and 7,642,223, each of which are incorporated by reference herein in its entirety.

In an embodiment, an MBAC of the type described herein displays reduced particle settling when compared with an otherwise similar composition lacking a biopolymer that has been modified as described herein (i.e., an MBA). The settling properties of the MBAC may be measured using any suitable technology. For example, the MBAC settling properties may be measured using a sedimentation test as described in Section 15.6 of ANSI/API Recommended Practice 10B-2 (Recommended Practices for Testing Well Cements), First Edition, July 2005, the relevant portions of which are incorporated herein by reference. Generally, in the sedimentation test a sample fluid (e.g., MBAC) is subjected to dynamic pre-conditioning in a consistometer at a bottom hole circulating temperature (BHCT) in a high-pressure/high temperature curing chamber; transferred to as a tube; allowed to cure under static conditions at wellbore pressure and temperature, and sectioned about equally into an upper, middle, and lower portion and the density of each portion determined. In an embodiment, an MBAC when set may display a vertical variation in density of from about 0.1 ppg to about 0.5 ppg, alternatively from about 0.15 ppg to about 0.40 ppg, alternatively from about 0.20 ppg to about 0.35 ppg.

In an embodiment, MBACs of this disclosure may have a decreased fluid loss when compared to an otherwise similar composition lacking a biopolymer that has been modified as described herein (i.e., an MBA). Fluid loss may be measured in accordance with ANSI/API Recommended Practice 10B-2 (Recommended Practices for Testing Well Cements), First Edition, July 2005, the relevant portions of which are incorporated herein by reference. In an embodiment, the MBAC when set may display a fluid loss of from about 20 ml/30 min to about 150 ml/30 min, alternatively from about 25 ml/30 min to about 100 ml/30 min, alternatively from about 30 ml/30 min to about 60 ml/30 min.

The compositions disclosed herein may be used as wellbore cementing fluids to cement a well penetrating a subterranean formation. It is to be understood that "subterranean formation" encompasses both areas below exposed earth and areas below earth covered by water such as ocean or fresh water.

In an embodiment, the MBACs may be employed in well completion operations such as primary and secondary cementing operations. The MBAC may be placed into an annulus of the wellbore and allowed to set such that it isolates the subterranean formation from a different portion of the wellbore. The MBAC thus forms a barrier that prevents fluids in that subterranean formation from migrating into other subterranean formations. Within the annulus, the MBAC also serves to support a conduit, e.g., casing, in the wellbore. In an embodiment, the wellbore in which the MBAC is positioned belongs to a multilateral wellbore configuration. It is to be understood that a multilateral wellbore configuration includes at least two principal wellbores connected by one or more ancillary wellbores.

In secondary cementing, often referred to as squeeze cementing, the sealant composition may be strategically positioned in the wellbore to plug a void or crack in the conduit, to plug a void or crack in the hardened MBAC (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

The MBAC may be introduced to the wellbore to prevent the loss of aqueous or non-aqueous drilling fluids into loss-circulation zones such as voids, vugular zones, and natural or induced fractures while drilling. In an embodiment, the MBAC is placed into a wellbore as a single stream and activated by downhole conditions to form a barrier that substantially seals loss circulation zones. In such an embodiment, the MBAC may be placed downhole through the drill bit forming a composition that substantially eliminates the lost circulation. Methods for introducing compositions into a wellbore to seal subterranean zones are described in U.S. Pat. Nos. 5,913,364; 6,167,967; and 6,258,757, each of which is incorporated by reference herein in its entirety.

The MBAC, after hardening, may form a non-flowing, intact mass with good strength and capable of withstanding the hydrostatic pressure inside the loss-circulation zone. Said MBAC may plug the zone and inhibit the loss of subsequently pumped drilling fluid thus allowing for further drilling. It is to be understood that, it may be desired to hasten the viscosification reaction for swift plugging of the voids. Alternatively, it may be desired to prolong or delay the viscosification for deeper penetration into the voids as described previously herein. For example, the MBAC may form a mass that plugs the zone at elevated temperatures, such as those found at higher depths within a wellbore.

In various embodiments, MBACs of this disclosure may provide desirable rheological and/or operational properties when compared to otherwise similar composition lacking a biopolymer that has been modified as described herein (i.e., an MBA). The delayed viscosity of the MBAC may enable the use of lower pump pressures and higher pump rates than possible if unmodified biopolymer is to be used, which may advantageously prevent unintentional fracturing in fragile areas such as unconsolidated zones because of reduced equivalent circulating density (ECD) of the fluids during pumping. Herein, an ECD refers to the effective density exerted by a circulating fluid against the formation. ECD may be interpreted as the density of a hypothetical fluid, which in static conditions and at any depth produces the same pressure as a given drilling mud in dynamic conditions. It takes into account the pressure drop in the annulus above the point, for example the zone against which the cement is being placed. The ECD is calculated as: $d+\Delta P/0.052*D$, where d is the cement slurry density in ppg, $\Delta P$ is the pressure drop in the annulus between depth D and surface in psi, and D is the true vertical depth (feet). The ECD may be a significant factor in wellbore servicing operations, particularly in wells that have a narrow window between the fracture gradient and pore-pressure gradient. Excessive ECDs may result in fluid pressure exceeding the fracture gradient of the formation, resulting in formation fracture, which may also lead to loss of pumped fluid into induced fractures. For a given pipe geometry and fluid velocity, the pressure drop is directly proportional to a friction factor, at least for the case of fluids in laminar flow. The delayed viscosity MBAC fluids initially provide for fluids with low friction factors, thus for lower ECDs.

EXAMPLES

The following examples are given as particular embodiments of the disclosure and to demonstrate the practice and advantages thereof. It is understood that the examples are given by way of illustration and are not intended to limit the specification or the claims in any manner. In the following examples, a biopolymer in solid state was treated with the indicated organic carbonate simply by dropwise addition of the organic carbonate in liquid form with a pipette onto a thin, spread out layer of the solid biopolymer in a granular form with vigorous intermittent shaking of the solid during the addition in order to expose fresh solid surface, and to form a homogeneous liquid coating on the solid biopolymer. In the case where the organic carbonate is a solid, for example ethylene carbonate, the solid carbonate was finely ground to >40 mesh size prior to mixing with the solid biopolymer, and the resulting mixture is mixed thoroughly by shaking. In case the biopolymer had significant amounts of moisture adsorbed or retained, a dehydration step to reduce the moisture contents below 10% by weight of the polysaccharide, and most preferably below 1% by weight of the polysaccharide was included prior to exposure of the biopolymer to the organic carbonate.

Example 1

An MBA of the type described herein was prepared and its effect on the rheological, physical, and mechanical properties of a cement composition investigated. Specifically, samples were prepared that contained an MBA comprising HEC and pulverized ethylene carbonate in a weight ratio of 1.0:0.1 HEC:ethylene carbonate or 1.0:0.15 HEC:ethylene carbonate. The solid samples were heated to 180° F. and the product, designated MBA-1, were used in the preparation of cement slurries. For example, an MBA-1 was produced by reacting 10 gm of HEC with 1.0 gm of ethylene carbonate at 180° F. for 6.0 hours. Thermogravimetric analysis (TGA) of the product, shown in FIG. 1, indicated that all ethylene carbonate and unmodified HEC were consumed in the reaction and a new polymer product was formed.

Xanthan polymer was reacted with different organic carbonates under the conditions described above, and the resulting products were submitted for molecular weight measurements by gel permeation chromatography using 0.2M sodium nitrite as the carrier fluid. The results are presented in Table 1. The viscosities were measured of solutions of either xanthan or modified xanthan using a Brookfield PVT viscometer equipped with a #3 Spindle.

TABLE 1

| Carbonate | Xanthan: Carbonate Wt ratio | Viscosity @ 1.5 rpm, cP | Viscosity @ 6 rpm, cP | Viscosity @ 30 rpm, cP | Mol. Wt. | Polydispersity Index |
|---|---|---|---|---|---|---|
| None - Control | 1.0:0.0 | 7300 | 2530 | 680 | 3.98e+6 | 1.25 |
| Ethylene carbonate ("EC") | 1.0:0.132 | 9200 (Note 1) | 4300 (Note 1) | 1640 (Note 1) | 5.889e+6 | 1.06 |
| Propylene Carbonate ("PC") | 1.0:0.132 | 11200 | 4100 | 1040 | 6.997e+6 | 1.32 |
| Glyceryl Carbonate ("GC") | 1.0:0.130 | 20000 | 7600 | 2200 | 6.929e+6 | 1.50 |
| Butylene Carbonate ("BC") | 1.0:0.122 | 12000 | 4000 | 1040 | 4.435e+6 | 1.26 |
| Diethyl Carbonate ("DEC") | 1.0:0.122 | 12400 | 4000 | 1000 | 5.667e+6 | 1.24 |

(Note 1):
Hydrated at room temperature for 18 hours followed by hydration at 80° C. for 3 hours before submitting for molecular weight measurements. The material was still cloudy showing incomplete hydration.

The data in Table 1 demonstrates that the molecular weight of unmodified xanthan is increased by treatment with organic carbonates, which without wishing to be limited by theory results in the observed increased viscosities. Incomplete hydration/dissolution of the ethylene carbonate treated material may have resulted in inaccuracies in the molecular weight determinations of these materials.

Example 2

Cement samples having a density of 12.5 ppg were prepared and contained 300 grams of class G cement, 337 grams of water, and 3.0 grams (1.0% bwoc) of MBA-1. Comparative samples were prepared contained 300 grams of class G cement, 337 grams of water, and 3.0 grams (1.0% bwoc) of HEC. The viscosity of the slurry samples was determined using a FANN viscometer at the RPMs indicated in Table 2 at either room temperature (RT) or at 170° F., as noted.

TABLE 2

| RPM | Comparative base RT readings | Comparative base 170° F. readings | MBA-1 base RT readings | MBA-1 base 170° F. readings |
|---|---|---|---|---|
| 600 | 284 | 176 | 16 | 234 |
| 300 | 220 | 148 | 9 | 210 |
| 200 | 200 | 115 | 7 | 154 |
| 100 | 160 | 78 | 5 | 113 |
| 6 | 38 | 22 | 3 | 30 |
| 3 | 24 | 12 | 2.5 | 20 |

The results in Table 2 demonstrate that the slurry viscosity for samples containing MBA-1 at room temperature is very low relative to the comparative samples (i.e., samples using an unmodified biopolymer). For example, at 60 rpm the samples containing MBA-1 have a FANN reading of 16 whereas the comparative sample has a FANN reading at 600 rpm of 284. In contrast, the viscosity at 170° F. is higher in the case of MBA-1 containing samples, indicating that MBA-1 dissolved at elevated temperature in the cement slurry. For example, at 600 rpm and 170° F. the samples containing MBA-1 have a FANN reading of 234 while the comparative sample has a FANN reading at 600 rpm and 170° F. of 176. In addition to dissolution of MBA-1 at elevated temperature, the viscosity of the slurry samples is expected to increase in part due to the higher molecular weight product produced as a result of reacting HEC with ethylene carbonate (MBA-1). The molecular weight increase after modification was shown for xanthan biopolymer in Table 1.

MBA-1 containing samples were also found to have reduced fluid loss. Comparative samples having an unmodified biopolymer had a fluid loss of 65 ml in 10 minutes (API fluid loss 225 ml/min) however for samples containing MBA-1 the fluid loss was 57 ml in 30 minutes (API fluid loss 114 ml/min).

Figure 2:
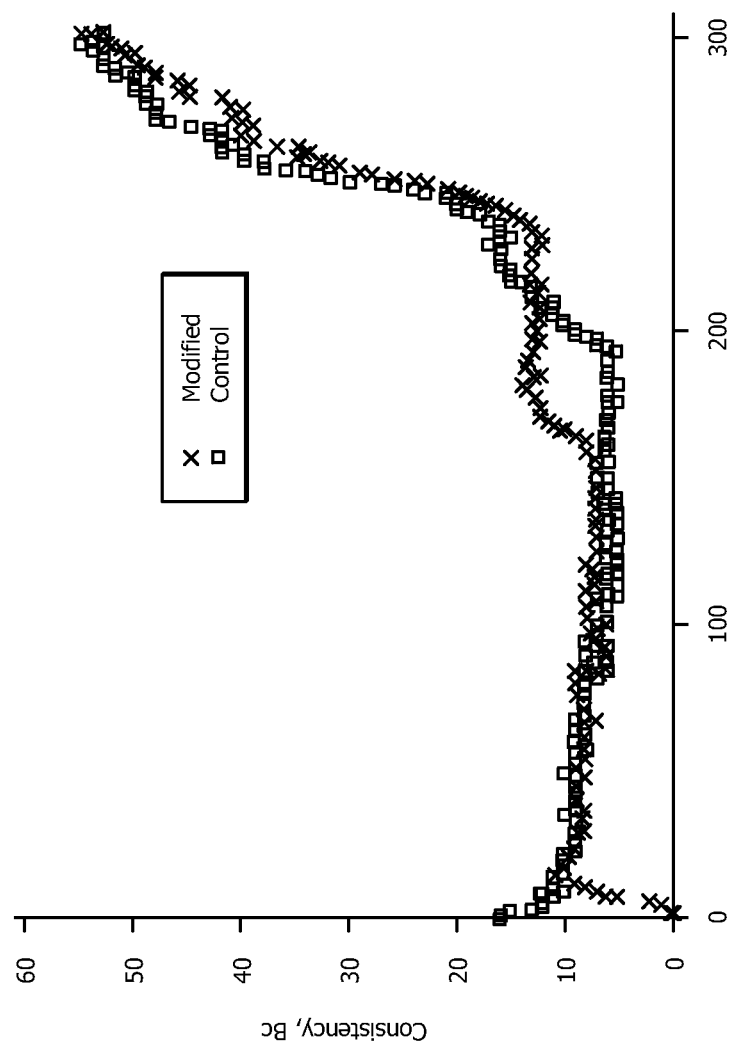
FIG. 2 shows the thickening time of samples from Example 1.

The effect of MBA-1 on particle settling in the cementitious samples was also investigated. Particularly, set cement samples containing MBA-1 were subjected to the sedimentation test as described previously herein. Samples containing MBA-1 exhibited a less than 5% density variation with densities of 12.20 ppg, 12.45 ppg, and 12.52 ppg for the top, middle, and bottom portions, respectively. Further, compositions comprising MBA-1 displayed an increase in compressive strength when compared to the comparative samples. Specifically, the compressive strength after 48 hours for a sample containing MBA-1 was 800 psi whereas the compressive strength of the comparative sample was 500 psi indicating that presence of MBA-1 may facilitate compressive strength development. Despite the effects of MBA-1 on the various properties, the thickening time of samples containing MBA-1 desirably appears similar to that of the comparative as shown in FIG. 2. The thickening time refers to the time required for the composition to achieve 70 Bearden units of Consistency (Bc). At about 70 Bc, the slurry undergoes a conversion from a pumpable fluid state to a non-pumpable paste.

Example 3

An MBA of the type described in Example 1 and its effect on the rheological, physical, and mechanical properties of a cement composition investigated. The MBA was prepared by mixing 10 grams of hydroxyethylcellulose and 1.2 grams of ethylene carbonate (1:0.12 weight ratio) and heating the mixture for 20 hours at 180° F. to produce an MBA, designated MBA-2. A cement slurry having a density of 15.8 ppg, comprising 400 grams of class H cement, 176 grams of water, and 4.4 grams of (1.1% bwoc) of MBA-2 was prepared. Comparative samples were prepared using identical amounts of components but with unmodified biopolymer instead of MBA-2. The viscosity of the slurry samples was determined using a FANN viscometer at the RPMs indicated in Table 3 at either room temperature (RT) or at 170° F.

TABLE 3

| RPM | Comparative base RT readings | Comparative base 170° F. readings | MBA-2 base RT readings | MBA-2 170° F. readings |
|---|---|---|---|---|
| 600 | 300+ | 300+ | 45 | 300+ |
| 300 | 300+ | 207 | 20 | 229 |
| 200 | 300+ | 153 | 14 | 164 |
| 100 | 272 | 86 | 7 | 93 |
| 6 | 39 | 12 | 3 | 12 |
| 3 | 25 | 9 | 2 | 10 |

Figure 3:
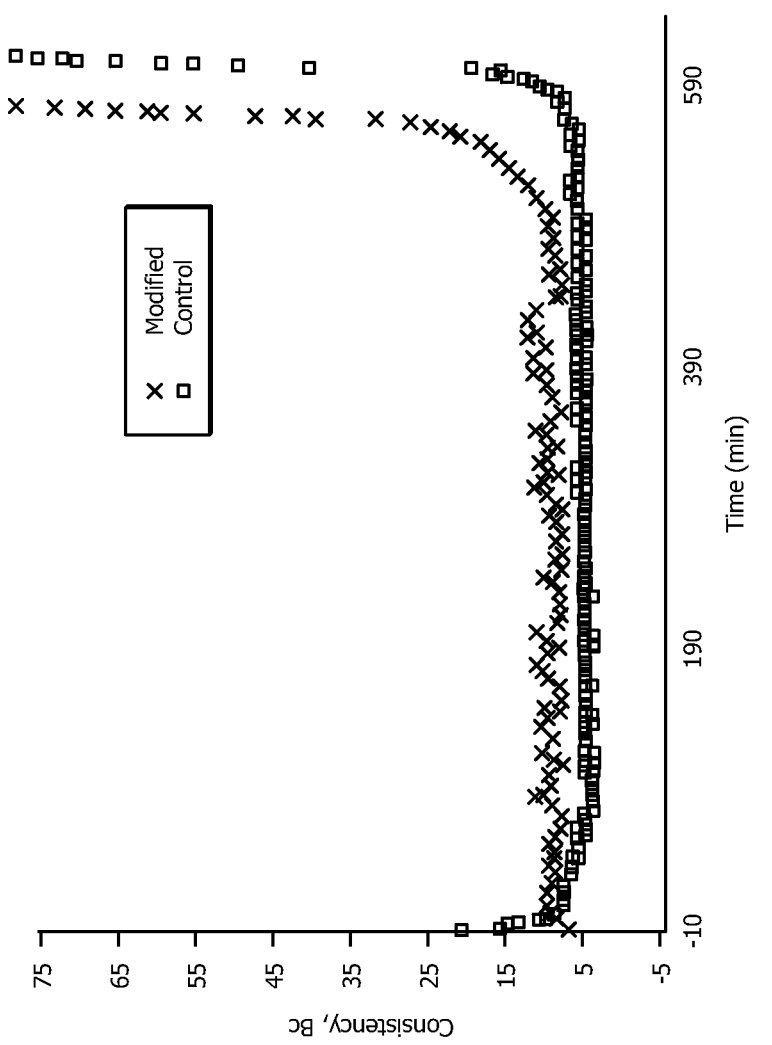
FIG. 3 shows the thickening time of samples from Example 2.

The results in Table 3 demonstrate that there is a large difference in slurry viscosity between samples containing MBA-2 at room temperature and the comparative sample (i.e., having an unmodified biopolymer). For example, at 600 rpm and RT, the samples containing MBA-2 have a FANN reading of 45 whereas the comparative sample has a FANN reading at 600 rpm and RT of greater than 300. In contrast, the viscosity of the MBA-2 containing sample and comparative sample are comparable at 600 rpm and 170° F. MBA-2 demonstrates a fluid loss comparable to that of the comparative sample at 56 ml in 30 minutes and 54 ml in 30 minutes for MBA-2 containing samples and the comparatives respectively. Despite the effects of MBA-2 on the various properties, the thickening time of samples containing MBA-2 desirably appears similar to that of the comparative as shown in FIG. 3.

Example 4

Cement Slurries of different densities containing an MBA comprising ethylene carbonate and HEC were prepared and their rheologies tested at room temperature (RT) and 190° F. In the case of a high density cement slurry (density=18 ppg) a comparative slurry was also tested. The results are given in Table 4.

TABLE 4

| Density ppg | 13.4 | 14.5 | 15.5 | 18 | 18 |
|---|---|---|---|---|---|
| Class H Cement (% bwoc) | 100 | 100 | 100 | 100 | 100 |
| Water (% bwoc) | 81.3 | 61.2 | 48.31 | 52.9 | 52.9 |
| MBA (% bwoc) | 0.8 | 0.5 | 0.3 | 0.3 | — |
| Hi dense No. 4 (% bwoc) | — | — | — | 50 | 50 |

TABLE 4-continued

| Unmodified Biopolymer (% bwoc) | — | | — | | — | | — | | 0.3 | |
|---|---|---|---|---|---|---|---|---|---|---|
| Rheology | RT | 190° F. | RT | 190° F. | RT | 190° F. | RT | 190° F. | RT | 190° F. |
| 3 | 2.5 | 27 | 4 | 24 | 9 | 29 | 11 | 21 | 45 | 20 |
| 6 | 3 | 40 | 6 | 42 | 13 | 39 | 15 | 34 | 69 | 31 |
| 30 | 4 | 94 | 7 | 92 | 17 | 76 | 32 | 78 | 142 | 72 |
| 60 | 5 | 122 | 9 | 131 | 20 | 104 | 39 | 112 | 200 | 106 |
| 100 | 6 | 154 | 11 | 162 | 23 | 130 | 44 | 142 | 252 | 136 |
| 200 | 9 | 202 | 15 | 216 | 30 | 185 | 59 | 214 | 300+ | 198 |
| 300 | 12 | 235 | 19 | 242 | 42 | 212 | 74 | 259 | 300+ | 252 |
| 600 | 22 | 280 | 33 | 300+ | 65 | 296 | 127 | 300+ | 300+ | 300+ |
| Fluid loss at 190° F. (ml) | | 98 | | 106 | | 102 | | Calculated FL: 180 | | Calculated FL: 216 |

The results in Table 4 show that with the use of an MBA of the type described herein, non-settling water-extended lightweight slurries, as well as high density slurries with good fluid loss characteristics can be designed with low surface viscosities. Further, the samples display increased viscosification when the slurry temperatures reach bottom hole temperatures, at which thermal thinning and potential for particle settling is high, especially after slurry placement behind the casing.

Example 5

A cement job modeling was carried using the OPTICEM software package (Herschel-Buckley model) to calculate the shear thinning index (n), consistency (K), and loss due to friction (dp/dl) for samples containing MBA-1, MBA-2, a comparative sample for MBA-1, and a comparative sample for MBA-2. Each of these samples has been described in the previous experiments. OPTICEM software is a wellbore simulation program for simulating pumping and placing cement slurries in a wellbore, and is, commercially available from Halliburton Energy Services. Shear thinning index refers to the ratio of the viscosity at 1 rpm shear to the viscosity at 10 rpm, the consistency, κ, refers to the viscosity (or stress) at a shear rate of 1 s$^1$, while the loss due to friction, dp/dl (psi/ft), is a measure of the local loss of internal friction due to changes in fluid rheology. The results of these calculations for room temperature rheologies are presented in Table 5. The corresponding calculations for rheologies at 170° F. are provided in Table 6. For the OPTICEM software calculations, the following parameters are kept constant: pumping rate=5 bpm, inner diameter of casing=7.5 inch; outer diameter of casing=9.0 inch; well depth=20,000 ft.

TABLE 5

| Sample | n | K (lbf s$^n$/ft$^2$) | dp/dl (psi/ft) |
|---|---|---|---|
| Comparative for MBA-1 | 0.39 | 0.2057 | 0.5285 |
| MBA-1 | 1 | 0.0001 | 0.0196 |
| Comparative for MBA-2 | 0.5 | 0.6695 | 1.2367 |
| MBA-2 | 1 | 0.0004 | 0.0416 |

TABLE 6

| Sample | n | K (lbf s$^n$/ft$^2$) | dp/dl (psi/ft) |
|---|---|---|---|
| Comparative for MBA-1 | 0.443 | 0.090 | 0.3156 |
| MBA-1 | 0.419 | 0.1446 | 0.4373 |
| Comparative for MBA-2 | 0.811 | 0.0138 | 0.4181 |
| MBA-2 | 0.849 | 0.0120 | 0.4539 |

Tables 5 and 6 clearly demonstrate the large differences in the shear thinning, consistency, and loss due to friction between samples containing MBA-1 or MBA-2 and the comparative samples. MBA-containing samples demonstrate a large increase in the consistency and loss due to friction with a substantive decrease in the shear thinning index while being pumped down the casing and up the annulus, and placement behind the casing. In Table 5, room temperature rheologies of cement slurries containing an MBA and an unmodified biopolymer are compared. The results show that when both samples are in a modified state (MBA-1 and MBA-2) their rheologies at RT will be very low, and as a result they will behave like Newtonian fluids (n=1). On the other hand, for slurries containing unmodified biopolymers (comparative for MBA-1 and comparative for MBA-2) the slurries will be viscous, and they will behave like shear thinning fluids (n<1). MBAs when heated at 170° F. will dissolve, and viscosify the slurries, and as a result they will behave like shear thinning fluids (n<1) as shown in Table 6. The low friction loss values at room temperature (surface conditions) that increase with increase in temperature indicate that cement slurries can be pumped at faster rates using lower pump pressures at ECD values low enough not to exceed the fracture gradient of the formation.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of cementing a wellbore comprising:
    preparing a wellbore cementing composition comprising a cementitious material, water and a modified biopolymer additive, wherein the modified biopolymer additive is the reaction product of a process comprising contacting a biopolymer and an organic carbonate to form a reaction mixture and subjecting the reaction mixture to a temperature of from about 100° F. to about 250° F.; wherein the wellbore cementing composition has an initial viscosity of from about 5 cP to about 100 cP and wherein the cementitious material comprises a hydraulic cement;
    placing the wellbore cementing fluid in the wellbore; and
    allowing it to set.

2. The method of claim 1 wherein the biopolymer and organic carbonate when contacted are in a solid state.

3. The method of claim 1 wherein the biopolymer is selected from the group consisting of gums, polysaccharides, derivatives thereof and combinations thereof.

4. The method of claim 1 wherein the biopolymer is selected from the group consisting of alginic acid, beta-glucan, carrageenan, chicle gum, dammar gum, gellan gum, guar gum, gum arabic, gum ghatti, gum tragacanth, karava gum, locust bean gum, mastic gum, psyllium seed husks, sodium alginate, spruce gum, tara gum, xanthan gum, hydroxypropyl guar, carboxymethyl hydroxypropyl guar, diutan and combinations thereof.

5. The method of claim 1 wherein the biopolymer is selected from the group consisting of cellulose, derivatized cellulose, hydroxyethyl cellulose, hydroxypropyl cellulose, carboxymethyl cellulose, carboxymethylhydroxyethyl cellulose and combinations thereof.

6. The method of claim 1 wherein the biopolymer has a molecular weight (MW) of from about 100,000 Daltons to about 10,000,000 Daltons.

7. The method of claim 1 wherein the biopolymer is in a solid form and has a mesh size of from about 80 to about 200.

8. The method of claim 1 wherein the biopolymer is present in the reaction mixture in an amount of from about 75 wt. % to about 95 wt. % based on a total weight of the reaction mixture.

9. The method of claim 1 wherein the organic carbonate is characterized by the general formula ROCOOR' wherein each R and R' may independently be selected from the group consisting of alkyl group, a cycloalkyl group, a substituted cycloalkyl group, an aryl group, or a substituted aryl group a heteroaryl group; and a substituted heteroaryl group.

10. The method of claim 1 wherein the organic carbonate is selected from the group consisting of ethylene carbonate, trimethylene carbonate, dimethyl trimethylene carbonate, 3-ethyl-3-hydroxymethyl trimethylene carbonate, propylene carbonate, trimethylolpropane monocarbonate, 4,6 dimethyl-1,3-propylene carbonate, 2,2-dimethyl trimethylene carbonate, 1,3-dioxepan-2-one, glycerine carbonate, butylene carbonate, diethyl carbonate, derivatives thereof and combinations thereof.

11. The method of claim 1 wherein the organic carbonate is present in the reaction mixture in an amount of from about 5 wt. % to about 25 wt. % based on the total weight of the reaction mixture.

12. The method of claim 1 wherein the modified biopolymer additive has a solubility in water at room temperature of from about 0.01% to about 2.0%.

13. The method of claim 1 wherein the modified biopolymer additive is present in the wellbore cementing composition in an amount of from about 0.05% to about 5.0% by weight of cement.

14. The method of claim 1 wherein the wellbore cementing composition has a final viscosity greater than the initial viscosity.

15. The method of claim 1 wherein the wellbore cementing composition has an effective circulation density that is reduced when compared to an otherwise similar composition lacking a modified biopolymer additive.

16. The method of claim 1 wherein the wellbore cementing composition has a fluid loss of from about 20 ml/30 min to about 150 ml/30 min.

17. The method of claim 1 further comprising allowing the wellbore cementing composition to set and form a set cement.

18. The method of claim 17 wherein the set cement has a vertical variation in density of from about 0.1 ppg to about 0.5 ppg.

19. A method of cementing a wellbore comprising:
    obtaining a modified biopolymer additive in a solid state, wherein the modified biopolymer additive is a reaction product of a process comprising contacting a biopolymer and an organic carbonate to form a reaction mixture and subjecting the reaction mixture to a temperature of from about 100° F. to about 250° F. and wherein the modified biopolymer additive has a water solubility at room temperature of from about 0.01% to about 2.0%;
    placing the modified biopolymer additive into a cement slurry comprising a hydraulic cement;
    placing the cement slurry into the wellbore; and
    allowing the cement slurry to set.

20. The method of claim 19 wherein the biopolymer is selected from the group consisting of gums, polysaccharides, derivatives thereof and combinations thereof.

* * * * *

UNITED STATES PATENT AND TRADEMARK OFFICE
CERTIFICATE OF CORRECTION

| | | |
|---|---|---|
| PATENT NO. | : 8,720,562 B2 | Page 1 of 1 |
| APPLICATION NO. | : 12/907209 | |
| DATED | : May 13, 2014 | |
| INVENTOR(S) | : Reddy et al. | |

It is certified that error appears in the above-identified patent and that said Letters Patent is hereby corrected as shown below:

On the Title page, Item [75] replace "Sandip Pati" with --Sandip Patil--.

Signed and Sealed this
Twenty-second Day of July, 2014

Michelle K. Lee
*Deputy Director of the United States Patent and Trademark Office*